United States Patent

Tishken

[15] 3,707,103
[45] Dec. 26, 1972

[54] WORKSTOCK CUTTING APPARATUS

[72] Inventor: Paul Tishken, Birmingham, Mich.

[73] Assignee: Tishken Products Co., Detroit, Mich.

[22] Filed: Oct. 21, 1970

[21] Appl. No.: 82,702

[52] U.S. Cl. .................. 83/113, 83/250, 83/277, 83/282, 83/488
[51] Int. Cl. ............................. B26d 7/02, B26d 7/06
[58] Field of Search........ 83/113, 488, 250, 282, 277, 83/412, 461, 467, 484

[56] References Cited

UNITED STATES PATENTS

| | | | |
|---|---|---|---|
| 2,781,573 | 2/1957 | Espari et al. | 83/282 X |
| 3,504,585 | 4/1970 | Harris | 83/282 X |
| 2,397,974 | 4/1946 | Morrow et al. | 83/277 X |
| 3,572,200 | 3/1971 | Allison et al. | 83/113 X |
| 3,141,367 | 7/1964 | Keener et al. | 83/282 X |
| 3,552,254 | 1/1971 | Marczy | 83/461 |
| 1,745,873 | 2/1930 | Stoltz | 83/484 X |
| 1,283,922 | 11/1918 | Rowell | 83/113 |
| 3,244,047 | 4/1966 | Daniluk | 83/282 X |
| 3,244,042 | 4/1966 | Lakins et al. | 83/282 X |

Primary Examiner—James M. Meister
Attorney—Harness, Dickey & Pierce

[57] ABSTRACT

A workstock cutting apparatus for cutting relatively large metal workpieces and comprising a base structure, means for supporting workstock on the base structure and for selectively transferring the workstock toward a rotary cutting element, a carriage assembly for reciprocating the rotary cutting element toward and away from the workstock, and means for clampingly securing the workstock in a preselected position in confronting relationship with respect to the cutting element during a cutting operation.

25 Claims, 8 Drawing Figures

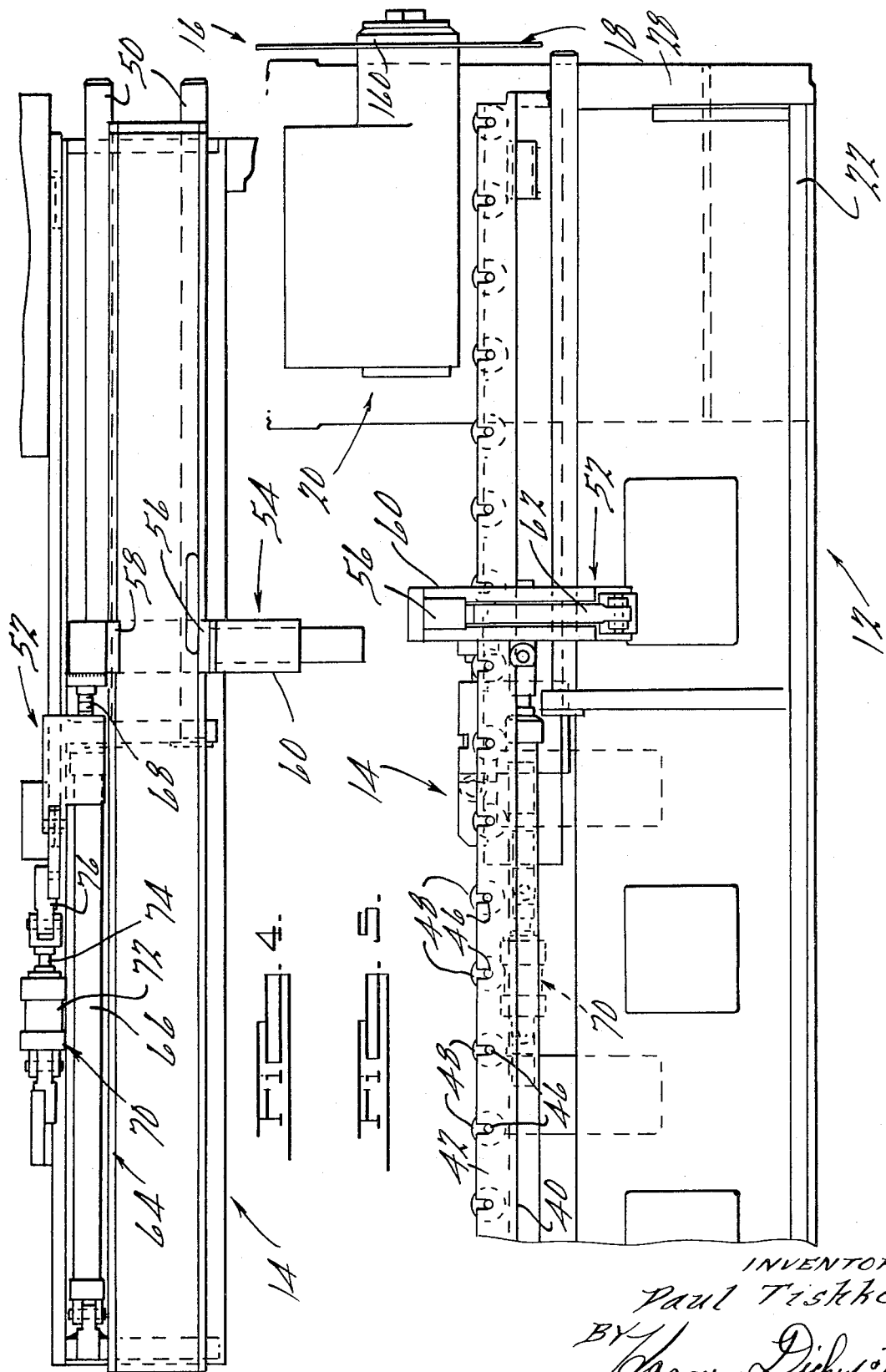

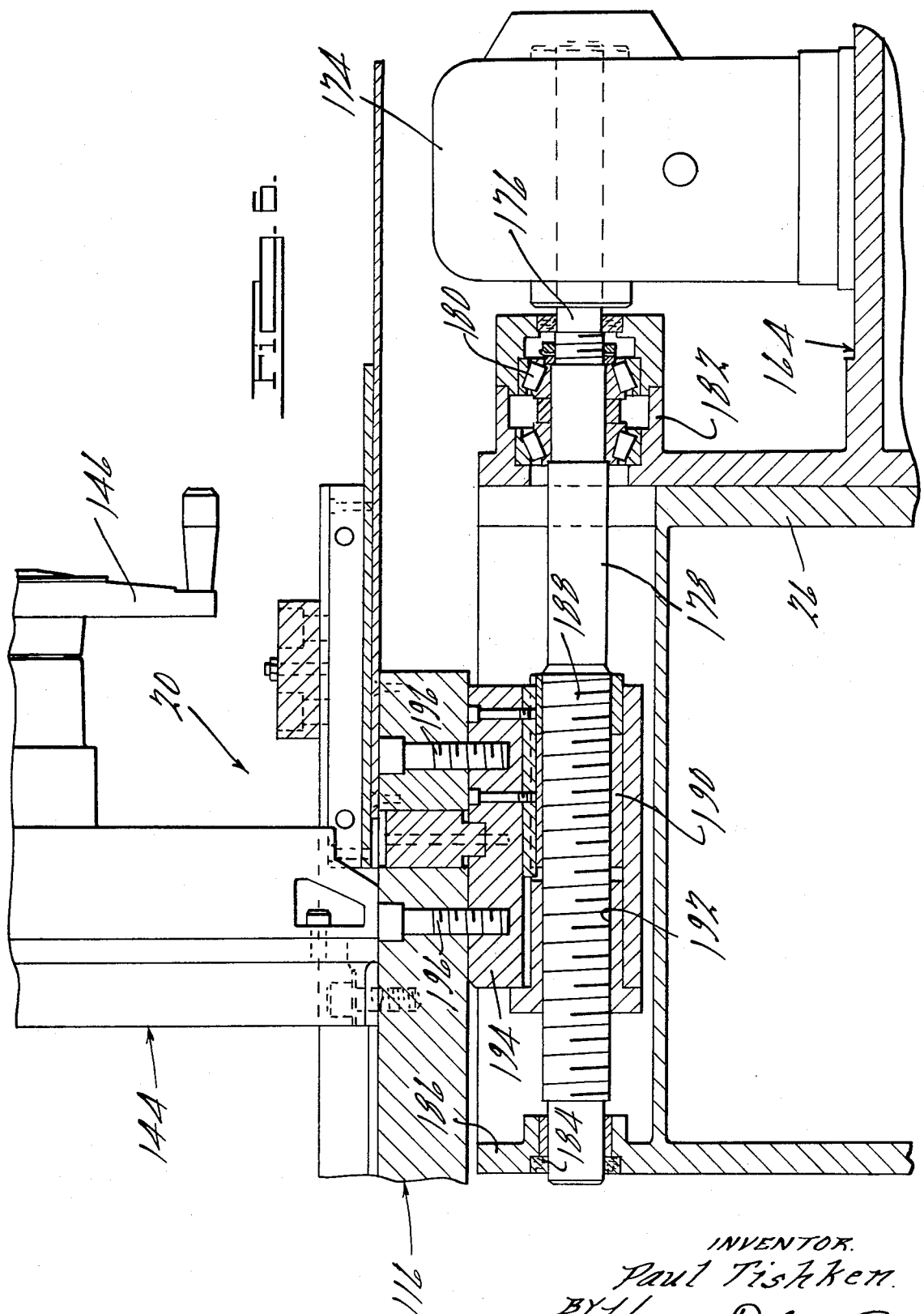

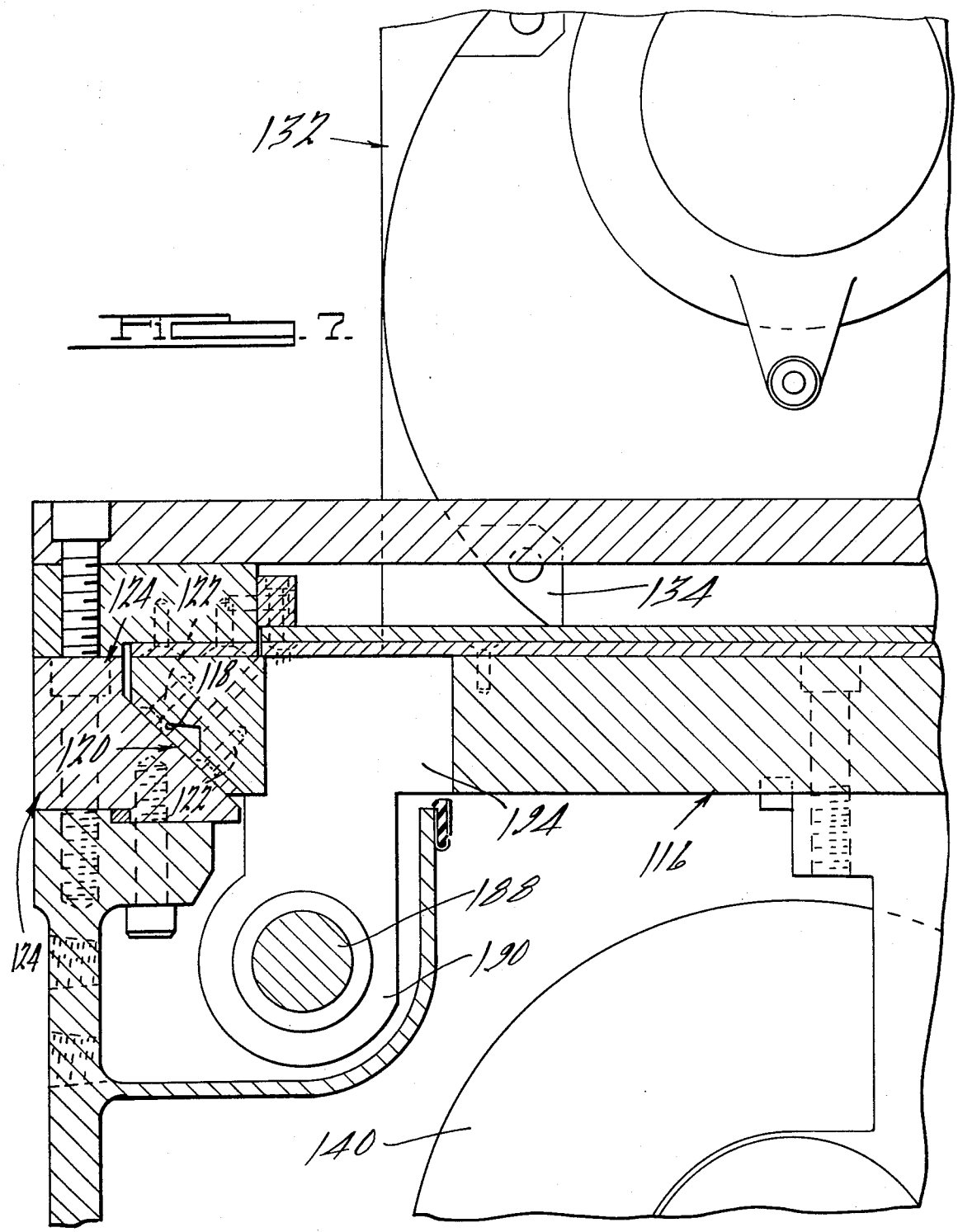

3,707,103

WORKSTOCK CUTTING APPARATUS

SUMMARY OF THE INVENTION

The present invention is generally directed toward means for cutting large metal workpieces, such as large bar stock, which is to be reduced in size for consumption in various manufacturing operations. More particularly, the present invention is directed toward a new and improved workstock cutting apparatus of the type which employs a rotary cutting element or blade that is provided with a multiplicity of hardened metal alloy metal cutting teeth fabricated, for example, of carbide or the like. The cutting element is mounted on a carriage assembly which is movable toward and away from a workstock support and feed mechanism, whereby the element may be moved toward and into cutting engagement or relationship with the workstock during a cutting operation and may thereafter be retracted upon completion of the cutting operation in order to permit an elongated workpiece to be progressively fed or transferred to a preselected position preparatory to a subsequent operational cycle. The workstock support and feed mechanism is provided with a clamping arrangement which is adapted to positively engage workstock thereon and fixedly secure said workstock against relative movement during each cutting cycle. The clamping arrangement includes means for momentarily retracting the uncut portion of the workstock upon completion of each cutting operation so that the cutting element may be retracted without any interference of the cutting teeth thereof with the workstock. The entire apparatus is intended to be completely automatic in operation and includes control means whereby the feed rate of the workstock and the rate at which the rotary cutting element is fed or traversed during a cutting operation may be carefully controlled.

It is accordingly a general object of the present invention to provide a new and improved apparatus for cutting large metal workpieces and the like.

It is a more particular object of the present invention to provide a new and improved metal workstock cutting apparatus which is particularly adapted for use with large heavy duty carbide teeth equipped rotary cutting elements.

It is another object of the present invention to provide a new and improved workstock cutting apparatus which includes means for progressively feeding and clampingly securing the workstock preparatory to and during each cutting operation.

It is still another object of the present invention to provide a new and improved workstock cutting apparatus of the above character which may be adapted for automatic controls whereby to minimize attendant labor costs.

It is yet another object of the present invention to provide a new and improved workstock cutting apparatus of an extremely durable construction and that will have a long, effective and maintenance free operational life.

Other objects and advantages of the present invention will become apparent from the following detailed description taken in conjunction with the accompanying drawings.

BRIEF DESCRIPTION OF THE DRAWINGS

FIG. 4 is a top elevational view of the workstock feeding mechanism incorporated in the apparatus of the present invention;

FIG. 5 is a front elevational view of the workstock feeding mechanism illustrated in FIG. 4;

FIG. 6 is a cross-sectional view of the cutting element advancing and retracting mechanism;

FIG. 7 is a transverse cross-sectional view of the mechanism illustrated in FIG. 6; and FIG. 8 is a transverse cross-sectional view of the workstock feeding mechanism illustrated in FIGS. 4 and 5.

DETAILED DESCRIPTION OF THE PREFERRED EMBODIMENT

Figure 1:
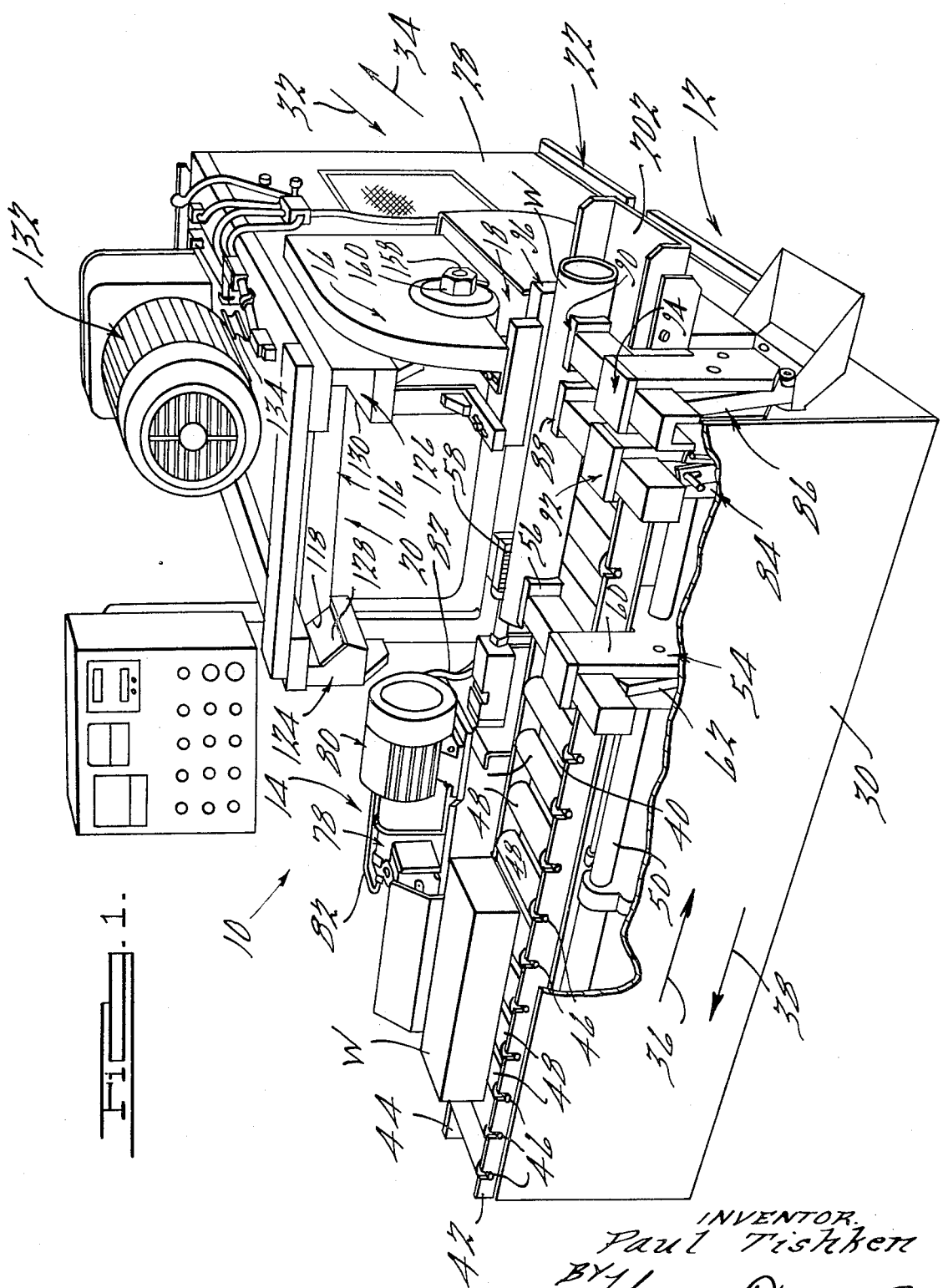
FIG. 1 is an elevated perspective view, partially broken away, of the workstock cutting apparatus of the present invention.
Figure 2:
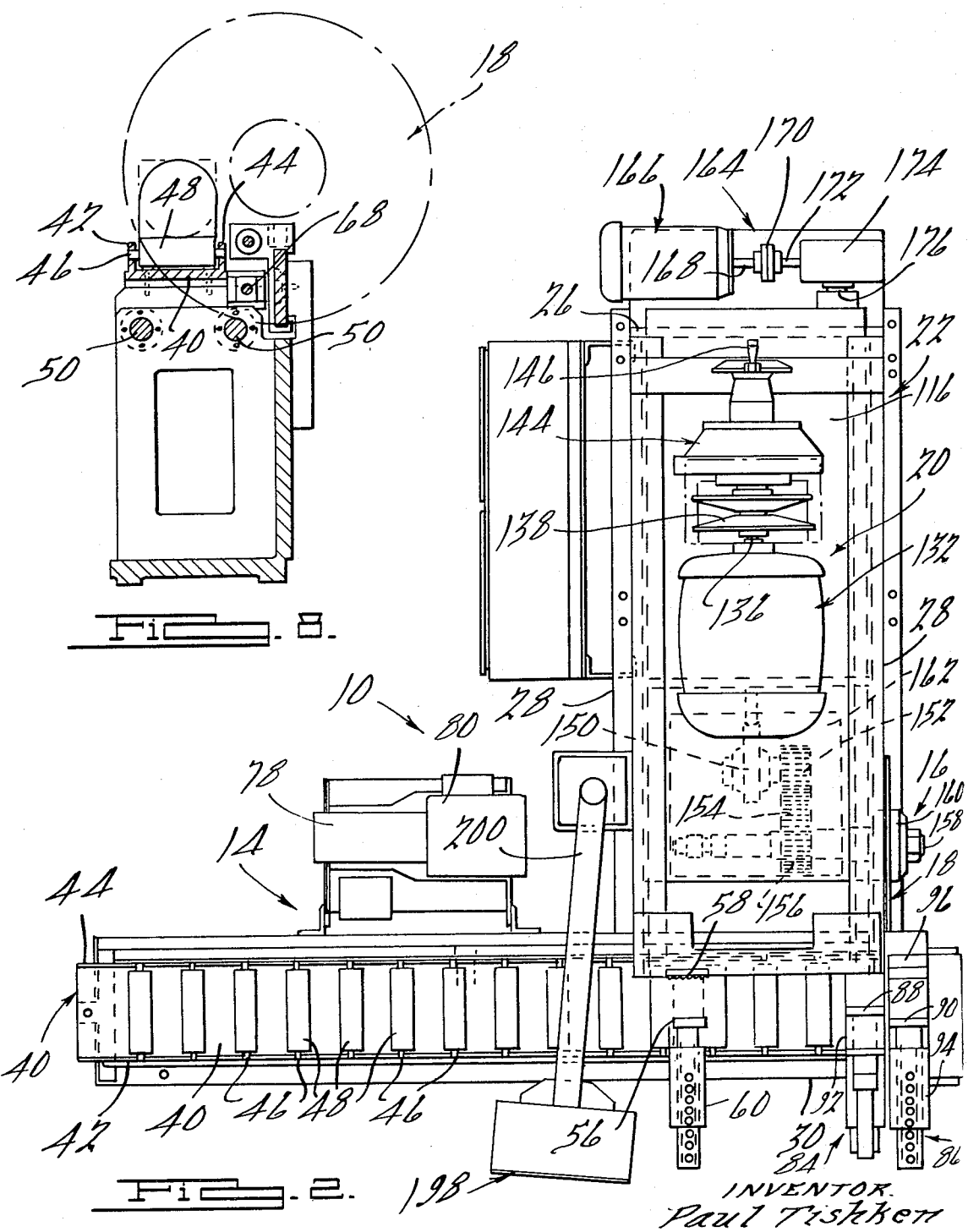
FIG. 2 is a top elevational view of the apparatus illustrated in FIG. 1.

Referring now in detail to the drawings, and in particular FIGS. 1 and 2 thereof, a workstock cutting apparatus 10, in accordance with an exemplary embodiment of the present invention, is shown generally as comprising a fixedly mounted base structure 12 that functions as a support means for a workstock support and transfer section 14, and a workstock cutting section 16 having a rotary cutting element or blade 18. The element 18 is movably supported upon a carriage assembly 20 which is adapted for reciprocal movement for transferring the cutting element 18 toward and away from workstock, herein designated by the letter W, that is supported upon the section 14, as will hereinafter be described in detail.

The base structure 12 generally comprises a relatively flat, horizontally disposed base member 22 which bears upon a suitable horizontal surface 24. The structure 12 further comprises a back side section 26, a pair of laterally spaced side sections 28, and a front side section 30. Generally speaking, the carriage assembly 20 is adapted to move forward and rearward in the direction of the arrows 32 and 34 in a generally parallel relationship to the side sections 28, while the workstock support and transfer section 14, on the other hand, is adapted to support and transfer workstock in the direction of the arrows 36 and 38 of a generally parallel to the front and rear side sections 30 and 26, respectively. Thus, it will be seen that the direction of transfer of the workstock W is at generally right angles to the direction of movement of the rotary cutting element 18.

Referring now in detail to the workstock transfer section 14, as best seen in FIGS. 4, 5 and 8, the section 14 comprises a generally horizontally disposed, laterally extending support member 40 which has a pair of upwardly extending, spaced parallel portions 42 and 44 formed integrally along the opposite sides thereof. The portions 42, 44 extend upwardly from the support member 40 and are adapted to support a plurality of laterally spaced, parallel roller shafts, generally designated 46, each of which carries an antifriction workstock support roller 48. As illustrated in FIG. 1, the rollers 48 are disposed in a general planar relationship so that the workstock W may be traversed along the upper peripheral portions thereof in the directions of the arrows 36 and 38 with a minimum amount of effort, as will be apparent to those skilled in the art.

Disposed below the plurality of workstock rollers 48 is a pair of laterally extending, spaced parallel shafts, generally designated 50 (see FIG. 8). The shafts 50 are adapted to in part slidingly support a workstock transfer mechanism, generally designated 52, which functions generally to transfer workstock W laterally along the rollers 48 toward engagement with the rotary cutting element 18. More particularly, the transfer mechanism 52 comprises a workstock clamping means 54 including a pair of clamping jaws 56 and 58 which are adapted to clampingly engage the opposite sides of the workstock W when the same is supported upon the rollers 48. The clamping jaw 58 is adapted to be fixed against relative movement in the direction of the arrows 32, 34, whereas the clamping jaw 56 is adapted to be movably supported by means of an associated support member 60 so that the jaw member 56 is movable toward and away from the jaw member 58 in order to clamp the workstock W therebetween. Means in the form of a suitable piston and cylinder assembly (not shown) and connecting linkage 62 is provided for selectively actuating the jaw member 56, which actuating mechanism, as will hereinafter be described, is designed to be entirely automatic so as to be properly sequenced during the operational cycle of the apparatus 10 of the present invention.

As best seen in FIGS. 4 and 5, the transfer mechanism 52 includes an elongated laterally extending piston and cylinder assembly, generally designated 64 that is disposed interjacent the shafts 50 and the support member 40. The mechanism 64 includes an elongated cylinder 66 within which a reciprocal piston (not shown) is disposed, the piston being connected to a suitable piston rod 68 that is connected to the clamping means 54. Upon proper actuation of the piston and cylinder mechanism 64, the entire clamping means 54 is adapted to move laterally in the directions of the arrows 36 and 38, whereby workstock W clampingly engaged between the jaws 56, 58 will be moved toward or away from the rotary cutting element 18.

An additional piston and cylinder mechanism 70 is mounted directly rearwardly of the mechanism 64 and comprises a cylinder 72 and piston rod 74 which is connected via suitable linkage means 76 with the clamping means 54. As will be described in connection with the overall operation of the workstock cutting apparatus 10 of the present invention, the piston and cylinder mechanism 70 is adapted to function as a "back-off" means for selectively withdrawing the workstock W away from the rotary cutting element 18 subsequent to each cutting cycle thereof, whereby to prevent any interference between the cutting teeth on the element 18 and the workstock W. The piston and cylinder mechanisms 64, 70 are preferably, although not necessarily, hydraulically operated, and accordingly, means in the form of a suitable hydraulic pump 78 which is operated by a conventional motor or the like 80 is provided on the apparatus 10 directly rearwardly of the workstock support and transfer section 14. As will be apparent to those skilled in the art, the pump 78 is connected via suitable fluid conduit means or the like 82 with the piston and cylinder mechanisms 64, 70 to communicate pressurized fluid therebetween.

Figure 3:
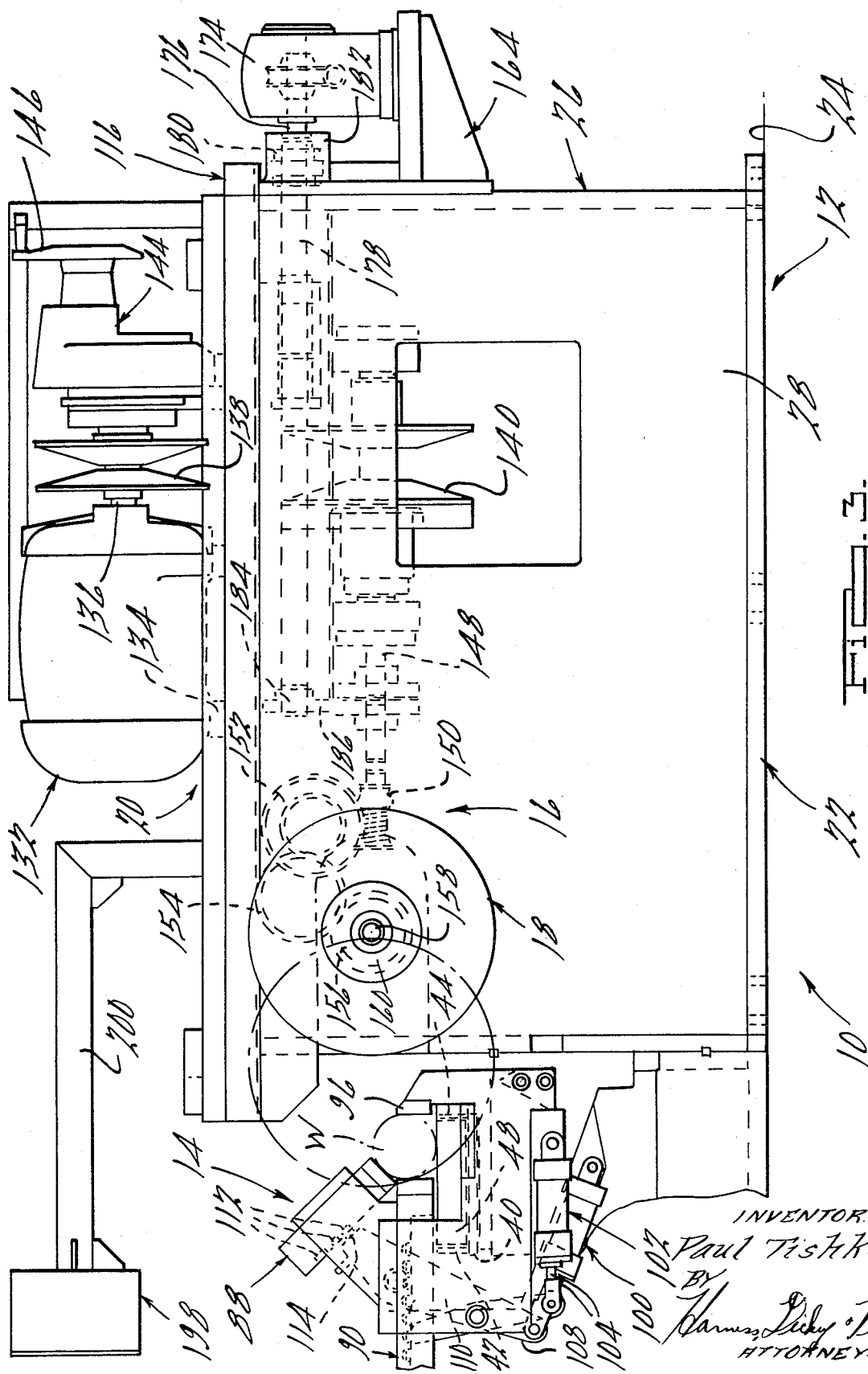
FIG. 3 is an end elevational view of the apparatus illustrated in FIG. 1.

The workstock cutting apparatus 10 of the present invention is preferably provided with two additional clamping means, generally designated 84 and 86, which are similar in construction and operation to the clamping means 54 and comprise movable jaw members 88 and 90, respectively, that are movably supported by suitable support members 92 and 94, respectively. The jaw members 88, 90 are cooperable with a suitable abutment member 96 that is disposed rearwardly thereof and cooperable therewith for clampingly securing a workpiece W in fixed relation to the apparatus 10. It will be noted that the clamping means 84, 86 are disposed on the laterally opposite sides of the path of movement of the rotary cutting element 18, whereby the workstock W will be positively secured in place during each cutting operation. As seen in FIG. 3, the movable jaw members 88, 90 are provided with suitable actuating piston and cylinder mechanisms 100 and 102, respectively, which are connected via suitable piston rods 104 and linkages 108, 110, respectively to the jaw members 88, 90. It will be noted that the support member 92 associated with the jaw member 88 may be movably mounted such that instead of being movable toward and away from the workstock W in generally horizontal direction, said member 88 may be adapted to be pivoted to an elevated position so as to direct a downwardly and rearwardly clamping force against the workstock W. Toward this end, the jaw member 88 may be provided with a plurality of recesses or blind bores 112 adapted for selective reception of a suitable locating stud or the like 114 on the linkage 110 for varying the orientation of the jaw member 88 and thus varying the direction of the applied clamping force exerted thereby, whereby to provide for universality of application for workpieces of various sizes and shapes.

Referring now in detail to the workstock cutting section 16 of the apparatus 10 of the present invention and in particular, to the carriage assembly 20, as best seen in FIGS. 1 and 7, the assembly 20 includes an elongated, generally flat or planar, horizontally disposed platform member 116 which is formed with downwardly inclined longitudinal side edges 118 that are provided with friction or bearing plates 120 fixedly secured to the edges 118 by means of suitable screws, bolts or the like 122. The platform member 116 is adapted to be longitudinally slidably supported upon a pair of laterally spaced, rearwardly extending spaced parallel guideway members 124 and 126 which are formed with downwardly and inwardly inclined bearing surfaces 128 and 130, respectively, with which the bearing plates 120 are slidably engaged, whereby the platform member 116 is movable rearwardly and forwardly in the direction of the arrows 32 and 34 upon the guideway members 124, 126.

Mounted on the upper side of the platform member 116 is a drive motor, generally designated by the numeral 132, which is preferably, although not necessarily, electrically energized and is provided with suitable mounting or attachment means 134 for fixedly securing the motor housing upon the platform member 116. As best seen in FIG. 3, the motor 132 includes a rearwardly projecting, generally horizontally disposed output shaft 136 which is connected via a suitable drive sheave or pulley arrangement 138 and a suitable drive belt (not shown) with a cooperative drive sheave or pulley 140 disposed subjacent the platform member 116. The rearward end of the shaft 136 is provided with a variable speed or adjustment mechanism, generally designated 144, which may be of any suitable type adapted, for example, to vary the rotational speed of the aforementioned drive belt in response to suitable movement of a manually engageable handle 146, as will be apparent to those skilled in the art.

The sheave or pulley 140 is rotatably mounted upon a suitable drive shaft 148 that extends generally parallel to the output shaft 136 and, like the pulley 140, is disposed below the platform member 116, as seen in FIG. 3. The forward end of the shaft 148 is provided with a worm gear or similar drive element 150 which is drivingly connected via suitable drive gears 152, 154 and 156 with a transversely or laterally extending drive shaft 158 upon which the rotary cutting element 18 is operatively disposed, the element 18 being operatively secured upon the shaft 158 by conventional retaining means or the like 160. As best shown in FIG. 2, the worm gear 150 and drive gears 152, 154 and 156 are disposed within a suitable housing or enclosure 162 which, like the drive shaft 158 is operatively disposed and supported upon the underside of the platform member 116 so as to be movable forwardly and rearwardly therewith. It will thus be seen that upon energization of the motor 132, the output shaft 136 thereof will effect rotational movement of the shaft 148 via the sheaves or pulleys 138, 140 and drive belt extending therebetween. Likewise, rotation of the shaft 148 will effect rotational movement of the shaft 158 via the gears 150, 152, 154 and 156 and hence will effect rotational movement of the rotary cutting element 18. Additionally, it will be appreciated by virtue of the fact that all of the aforesaid components are operatively mounted upon the platform member 116, forward and rearward movement of the member 116 in the direction of the arrows 32 and 34 will effect forward and rearward movement of the cutting element 18 toward and away from a workpiece W supported on the section 14 of the apparatus 10.

Referring now to the means for advancing and retracting the rotary cutting element 18 toward and away from the workstock W during each operational cycle of the apparatus 10, as will be seen in FIGS. 2 and 3, the back side section 26 is provided with a generally horizontally disposed support bracket 164 upon which is mounted a drive motor 166 having an output shaft 168. The shaft 168 is connected via a suitable coupling member 170 with the input shaft 172 of a right angle drive and speed reducer assembly 174 having an output shaft 176 that is arranged generally parallel to the guideways 124, 126. The output shaft 176 is drivingly connected to an elongated rotatable shaft member 178 which in turn is operatively supported at the rearward end of the apparatus 10 by means of a suitable bearing assembly 180 located within a structural portion 182 of the apparatus 10. The forward end of the shaft 178 is rotatably supported within a suitable bearing assembly 184 operatively disposed within a generally horizontally and laterally extending structural member 186, with the result that upon proper energization of the motor 166, the shaft 178 will be selectively rotated, as will be apparent. The shaft 178 is provided with an intermediate externally threaded section 188 which is adapted for cooperation with an internally threaded collar member 190 having a bore 192 through which the threaded section 188 of the shaft 178 extends. The collar member 190 is fixedly secured via suitable connecting elements 194 and screws, bolts or the like 196 with the platform member 116, with the result that upon rotation of the shaft 178, the platform member 116 will be moved longitudinally rearwardly and forwardly (depending upon the direction of rotation of the shaft 178) in the direction of the arrows 32, 34, whereby to drive the rotary cutting element 18 toward and away from the workstock W during each cutting operation.

As will be apparent to those skilled in the art, the apparatus 10 of the present invention may be provided with suitable operating controls for manually or automatically operating the same so as to provide for entirely automatic operation for feeding and cutting workstock or, alternatively, for operating the apparatus 10 on an individual cutting basis. By way of example, such controls may be provided in a suitable enclosure or the like 198 supported on a suitable boom or other structural member 200 at a position providing convenient access by the operator.

In operation of the workstock cutting apparatus 10 of the present invention, the rotary cutting element 18 thereof will typically be provided with a plurality of circumferentially spaced cutting teeth fabricated, for example, of a high carbon steel, as is well known in the art. Conventionally, such teeth are slightly larger in cross-section than the thickness of the cutting element 18, with the result that in certain prior known devices, under occasional operating conditions, as the cutting element 18 is retracted after the end of each cutting cycle, it is possible for interference to occur between the end of a workpiece which has previously been cut and the cutting teeth. This undesirable feature is entirely obviated by the present invention, as will be explained in the following description of a typical operational cycle thereof.

With reference to FIG. 1, a typical workpiece W is placed upon the plurality of rollers 48 and is biased laterally of the apparatus 10 to a position wherein the workstock W is interjacent the clamping jaws 56, 58. The piston and cylinder assembly 64 is thereafter actuated which results in laterally outward movement of the piston rod 68, whereby the workstock W is biased in the direction of the arrow 36 in FIG. 1 to a position wherein the extreme right end thereof is disposed in confronting relationship with the clamping jaws 88 and 90. Thereafter, the piston and cylinder mechanisms 100, 102 are actuated to clampingly secure the workstock W in a position wherein a portion thereof may be cut or severed upon forward movement of the cutting element 18. At such time as the workpiece W is properly clampingly secured, assuming that the motor 132 is energized resulting in rotational movement of the cutting element 18, the motor 166 is then energized which results in a preselected rotational movement of the shaft member 178. This in turn results in longitudinal forward movement of the entire carriage assembly 20, thereby causing the rotary cutting element 18 to be moved into cutting engagement with the workstock W. The rate of forward movement of the cutting element 18 is, of course, properly coordinated with the type (hardness) and shape of the particular workstock W being cut, and this may be controlled through proper adjustment of the assembly 174 and/or speed of the motor 166, as will be apparent. At such time as the carriage assembly 20 has moved forwardly a sufficient distance to effect complete cutting of the workstock W, the entire assembly 20 is moved rearwardly through proper actuation of the motor 166, assembly 174 and shaft member 178. Concurrently with rearward movement of the carriage assembly 20, which, of course, results in rearward movement of the cutting element 18, the piston and cylinder assemblies 100, 102 are actuated so as to release the workpiece W. When this occurs, the section of the workpiece W that has been cut drops downwardly into a suitable delivery tray or conveyor, for example, as is indicated at 202, and simultaneously, the piston and cylinder mechanism 70 is actuated. This results in the remaining portion of the workstock W being moved toward the left or in the direction of the arrow 38 in FIG. 1 so that as the cutting element 18 moves rearwardly, i.e., in the direction of the arrow 34, there is no interference between the cutting teeth thereof and the workstock W. At such time as the cutting element 18 has moved sufficiently rearwardly, the piston and cylinder mechanism 64 is again actuated to bias the workpiece W in the direction of the arrow 36 to a position wherein the portion thereof which is to be cut is arranged in line with the direction of movement of the cutting element 18. Thereafter, the piston and cylinder assemblies 100, 102 are actuated so as to again clampingly secure the workpiece W in place, and the direction of movement of the carriage assembly 20 is reversed, resulting in forward movement in the direction of the arrow 32 of the cutting element 18 to effect the next successive cutting cycle. As previously mentioned, the entire operation of the workstock cutting apparatus 10 of the present invention may be automatic through proper utilization of conventional limit switches and well known machine control elements, and since such components and the use thereof are well known in the art, a detailed description thereof has been omitted in order to simplify the subject description.

While it will be apparent that the preferred embodiment illustrated herein is well calculated to fulfill the objects above stated, it will be appreciated that the present invention is susceptible to modification, variation and change without departing from the scope of the invention.

I claim:

1. In a workstock cutting apparatus, a base structure; means for supporting workstock on said structure and feeding said workstock along a preselected path, said means including first clamping means supported by said structure for movement along said path and for selectively clampingly engaging the workstock; a rotary workstock cutting element,; carriage means for traversing said element toward and away from workstock traversing said path; and first power operated means drivingly connected to said clamping drivingly for selectively retracting said workstock along said path whereby said cutting element may be traversed away from said workstock without interference therefrom.

2. A workstock cutting apparatus as set forth in claim 1 wherein said cutting element comprises a rotatable blade provided with a plurality of circumferentially extending hardened metal alloy cutting teeth.

3. A workstock cutting apparatus as set forth in claim 2 which includes second power operated means for advancing said workstock relative to said element and along said path.

4. A workstock cutting apparatus as set forth in claim 3 wherein said second power operated means includes piston and cylinder means for moving said workstock along said path.

5. A workstock cutting apparatus as set forth in claim 3 which includes roller means for supporting said workstock for longitudinal sliding movement toward and away from said rotary cutting element.

6. A workstock cutting apparatus as set forth in claim 1 which includes second clamping means for selectively fixedly securing workstock at preselected longitudinal positions along said path.

7. A workstock cutting apparatus as set forth in claim 1 which includes a carriage assembly for moving said cutting element toward and away from said path, said carriage assembly including a platform element for movably supporting a drive motor for rotatably driving said cutting element.

8. A workstock cutting apparatus as set forth in claim 1 which includes second clamping means for selectively fixedly securing workstock at preselected longitudinal positions along said path, which includes a carriage assembly for moving said cutting element toward and away from said path, said carriage assembly including a platform element for movably supporting a drive motor for rotatably driving said cutting element.

9. A workstock cutting apparatus as set forth in claim 8 which includes guideway means movably supporting said platform element for movement toward and away from said path.

10. A workstock cutting apparatus as set forth in claim 9 wherein said guideway means operatively supports said platform element and is arranged at generally right angles to said path.

11. A workstock cutting apparatus as set forth in claim 10 wherein said guideway means supports said platform element in a manner such that said cutting element moves along a preselected line, and wherein said second clamping means is arranged on each side of said line for clampingly securing said workstock.

12. A workstock cutting apparatus as set forth in claim 1 wherein said first clamping means includes actuating means for moving said clamping means toward and away from clamping engagement with the workstock.

13. A workstock cutting apparatus as set forth in claim 12 which includes second clamping means arranged on the opposite sides of the line of movement of said rotary cutting element for clampingly securing said workpiece during a cutting operation.

14. A workstock cutting apparatus as set forth in claim 13 which includes means for selectively fixedly securing workstock at preselected longitudinal positions along said path, which includes a carriage assembly for moving said cutting element toward and away from said path, said carriage assembly including a platform element for movably supporting a drive motor rotatably driving said cutting element, and which includes guideway means operatively supporting said platform element and arranged at generally right angles to said path.

15. A workstock cutting apparatus as set forth in claim 1 wherein said actuating means comprises piston and cylinder means.

16. A workstock cutting apparatus as set forth in claim 1 which includes means for selectively fixedly securing workstock at preselected longitudinal positions along said path, which includes a carriage assembly for moving said cutting element toward and away from said path, said carriage assembly including a platform element for movably supporting a drive motor rotatably driving said cutting element, which includes means for fixedly securing workstock and comprising second clamping means and actuating means for moving said clamping means toward and away from clamping engagement with the workstock.

17. A workstock cutting apparatus as set forth in claim 1 which includes means for selectively fixedly securing workstock at preselected longitudinal positions along said path, which includes a carriage assembly for moving said cutting element toward and away from said path, said carriage assembly including a platform element for movably supporting a drive motor for rotatably driving said cutting element, which includes guideway means supporting said platform element in a manner such that said cutting element moves along a preselected line, and which includes second clamping means arranged on each side of said line for clampingly securing said workstock.

18. A workstock cutting apparatus as set forth in claim 1 which includes means for selectively fixedly securing workstock at preselected longitudinal positions along said path, which includes a carriage assembly for moving said cutting element toward and away from said path, said carriage assembly including a platform element for movably supporting a drive motor for rotatably driving said cutting element, which includes second power operated means for advancing said workstock along said path.

19. A workstock cutting apparatus as set forth in claim 1 which includes means for selectively fixedly securing workstock at preselected longitudinal positions along said path, which includes a carriage assembly for moving said cutting element toward and away from said path, said carriage assembly including a platform element for movably supporting a drive motor rotatably driving said cutting element, wherein said means for feeding said workstock along said path comprises piston and cylinder means.

20. A workstock cutting apparatus as set forth in claim 2 which includes means for selectively fixedly securing workstock at preselected longitudinal positions along said path, which includes a carriage assembly for moving said cutting element toward and away from said path, said carriage assembly including a platform element for movably supporting a drive motor rotatably driving said cutting element, which includes second power operating means for advancing said workstock relative to said element along said path, and wherein said first clamping means is clampingly engageable with workstock and movable toward and away from said rotary cutting element to selectively advance and retract said workstock, and which includes second clamping means arranged on the opposite sides of the line of movement of said rotary cutting element for clampingly securing said workpiece during each cutting operation.

21. A workstock cutting apparatus comprising: a base structure; including means for supporting the workstock for relatively free motion; transfer means slidably supported by said structure for moving said workstock along said path; a carriage assembly slidably supported by said structure for movement toward and away from said preselected path; a rotary cutting element rotatably supported by said assembly, said movement of said assembly toward said path defining a cutting cycle of the workstock; and means connected to said transfer means for selectively withdrawing the workstock away from said element subsequent to each cutting cycle whereby to prevent any interference between said element and the workstock.

22. The apparatus as recited in claim 21 further comprising clamping means arranged on the opposite sides of the line of movement of said cutting element for clampingly securing said workstock during said cutting cycle.

23. A workstock cutting apparatus comprising: a base structure including means for supporting the workstock for relatively free motion along a preselected path; said structure further including guideway means arranged in a transverse direction relative to said path; a rotary workstock cutting element; a carriage assembly for moving said cutting element toward and away from said path with said movement toward said path defining a cutting cycle, said assembly including a platform element slidably supported by said guideway means and movably supporting a drive motor for rotatably driving said cutting element; transfer means slidably supported by said structure for moving said workstock along said path; said means including clamping means for engaging the workstock and first power operated means for advancing said workstock along said path relative to said cutting element; a second power operated means supported by said structure for selectively driving said carriage assembly toward and away from said path; and a third power operated means drivingly connected to said transfer means and supported by said structure, for selectively retracting the workstock relative to said cutting element along said path subsequent to each cutting cycle whereby to prevent any interference between said cutting element and the workstock.

24. The apparatus as recited in claim 23 which includes speed reducer means drivingly interposed between said cutting element and said drive motor for providing selective angular speed to said cutting element.

25. The apparatus as recited in claim 23 wherein said second power operated means includes a speed reducer assembly having an output shaft arranged generally parallel to said guideway means and drivingly connected to said platform.

* * * * *

UNITED STATES PATENT OFFICE
CERTIFICATE OF CORRECTION

Patent No. 3,707,103                    Dated December 26, 1972

Inventor(s) Paul Tishken

It is certified that error appears in the above-identified patent and that said Letters Patent are hereby corrected as shown below:

Column 7, line 67 (Claim 1), "drivingly" (second occurrence), should be --means--.

Signed and sealed this 12th day of June 1973.

(SEAL)
Attest:

EDWARD M. FLETCHER, JR.                 ROBERT GOTTSCHALK
Attesting Officer                       Commissioner of Patents